(12) United States Patent
Takahashi (10) Patent No.: US 9,521,339 B2
(45) Date of Patent: Dec. 13, 2016

(54) IMAGE PROCESSING APPARATUS, IMAGE CAPTURING APPARATUS, AND IMAGE PROCESSING METHOD

(71) Applicant: CANON KABUSHIKI KAISHA, Tokyo (JP)

(72) Inventor: Hayato Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/790,761

(22) Filed: Jul. 2, 2015

(65) Prior Publication Data

US 2016/0006960 A1  Jan. 7, 2016

(30) Foreign Application Priority Data

Jul. 7, 2014  (JP) ................................. 2014-139999

(51) Int. Cl.
*H04N 9/64* (2006.01)
*H04N 5/367* (2011.01)

(52) U.S. Cl.
CPC .................................... *H04N 5/367* (2013.01)

(58) Field of Classification Search
CPC .... H04N 5/367; H04N 5/3675; H04N 5/3658; H04N 5/361; H04N 5/363; H04N 5/365; H04N 1/1906
USPC ................................. 348/241, 243, 246, 247
See application file for complete search history.

(56) References Cited

U.S. PATENT DOCUMENTS

| 7,061,533 B1* | 6/2006 | Urushiya | G01N 23/04 |
| | | | 348/346 |
| 2007/0165119 A1* | 7/2007 | Ikeda | H04N 5/367 |
| | | | 348/246 |
| 2011/0233411 A1* | 9/2011 | Nishino | G01T 1/243 |
| | | | 250/361 R |
| 2014/0153841 A1* | 6/2014 | Tatsuzawa | G06T 5/003 |
| | | | 382/263 |

FOREIGN PATENT DOCUMENTS

JP    2008-278394 A    11/2008

* cited by examiner

*Primary Examiner* — Yogesh Aggarwal
(74) *Attorney, Agent, or Firm* — Cowan, Liebowitz & Latman, P.C.

(57) ABSTRACT

There is provided an image processing apparatus. A first correction unit sets each of a plurality of pixels included in an image as a target pixel in sequence, determines whether or not the target pixel is a defective pixel, and corrects the defective target pixel using peripheral pixels. The first correction unit does not use, in the correction of the target pixel, a defective pixel in the peripheral pixels that is known. A second correction corrects each corrected pixel that has been corrected by the first correction unit using a defective pixel which was unknown at the time of the correction, using the peripheral pixels used by the first correction unit. The second correction unit uses, for the defective pixel in the peripheral pixels used by the first correction unit, a corrected pixel by the first correction unit.

11 Claims, 12 Drawing Sheets

IMAGE PROCESSING APPARATUS, IMAGE CAPTURING APPARATUS, AND IMAGE PROCESSING METHOD

BACKGROUND OF THE INVENTION

Field of the Invention

The present invention relates to image processing apparatuses, image capturing apparatuses, and image processing methods.

Description of the Related Art

An image generated by an image capturing apparatus such as a digital camera may in some cases contain a defective pixel resulting from characteristics of an image sensor. Since a defective pixel causes deterioration of image quality, conventionally, the defective pixel has been corrected using information of peripheral pixels. For example, Japanese Patent Laid-Open No. 2008-278394 discloses a technique for selecting peripheral pixels that are to be used in correction based on whether or not a defective pixel to be corrected is included in a defective pixel group.

Although there are cases where another defective pixel is present at the periphery of the defective pixel to be corrected, it is not always known beforehand whether or not such another defective pixel is present. For this reason, the defective pixel to be corrected is in some cases corrected using peripheral pixels including the other defective pixel. In such cases, the correction accuracy decreases, which may possibly lead to deterioration of image quality of the corrected image that is ultimately obtained.

SUMMARY OF THE INVENTION

The present invention has been made in view of the foregoing situation, and provides a technique for suppressing a decrease in correction accuracy in the case where, in an image processing apparatus that corrects a defective pixel using peripheral pixels, another defective pixel is included in the peripheral pixels.

According to a first aspect of the present invention, there is provided an image processing apparatus comprising: a first correction unit configured to set each of a plurality of pixels included in an image as a target pixel in sequence, determine whether or not the target pixel is a defective pixel, and correct the target pixel using peripheral pixels of the target pixel in a case where the target pixel is determined to be a defective pixel, wherein the first correction unit does not use, in the correction of the target pixel, a defective pixel in the peripheral pixels that is known at the time of the correction of the target pixel; and a second correction unit configured to correct each corrected pixel that has been corrected by the first correction unit using a defective pixel which was unknown at the time of the correction, using the peripheral pixels used by the first correction unit, wherein the second correction unit uses, for the defective pixel in the peripheral pixels used by the first correction unit, a corrected pixel obtained by correcting the defective pixel by the first correction unit.

According to a second aspect of the present invention, there is provided an image capturing apparatus comprising: an image processing apparatus comprising: a first correction unit configured to set each of a plurality of pixels included in an image as a target pixel in sequence, determine whether or not the target pixel is a defective pixel, and correct the target pixel using peripheral pixels of the target pixel in a case where the target pixel is determined to be a defective pixel, wherein the first correction unit does not use, in the correction of the target pixel, a defective pixel in the peripheral pixels that is known at the time of the correction of the target pixel; and a second correction unit configured to correct each corrected pixel that has been corrected by the first correction unit using a defective pixel which was unknown at the time of the correction, using the peripheral pixels used by the first correction unit, wherein the second correction unit uses, for the defective pixel in the peripheral pixels used by the first correction unit, a corrected pixel obtained by correcting the defective pixel by the first correction unit; and an image capturing unit that generates the image.

According to a third aspect of the present invention, there is provided an image processing method performed by an image processing apparatus, the method comprising: a first correction step of setting each of a plurality of pixels included in an image as a target pixel in sequence, determining whether or not the target pixel is a defective pixel, and correcting the target pixel using peripheral pixels of the target pixel in a case where the target pixel is determined to be a defective pixel, wherein the first correction step does not use, in the correction of the target pixel, a defective pixel in the peripheral pixels that is known at the time of the correction of the target pixel; and a second correction step of correcting each corrected pixel that has been corrected in the first correction step using a defective pixel which was unknown at the time of the correction, using the peripheral pixels used in the first correction step, wherein the second correction step uses, for the defective pixel in the peripheral pixels used in the first correction step, a corrected pixel obtained by correcting the defective pixel in the first correction step.

According to a fourth aspect of the present invention, there is provided a non-transitory computer-readable storage medium storing a program for causing a computer to execute an image processing method, the method comprising: a first correction step of setting each of a plurality of pixels included in an image as a target pixel in sequence, determining whether or not the target pixel is a defective pixel, and correcting the target pixel using peripheral pixels of the target pixel in a case where the target pixel is determined to be a defective pixel, wherein the first correction step does not use, in the correction of the target pixel, a defective pixel in the peripheral pixels that is known at the time of the correction of the target pixel; and a second correction step of correcting each corrected pixel that has been corrected in the first correction step using a defective pixel which was unknown at the time of the correction, using the peripheral pixels used in the first correction step, wherein the second correction step uses, for the defective pixel in the peripheral pixels used in the first correction step, a corrected pixel obtained by correcting the defective pixel in the first correction step.

Further features of the present invention will become apparent from the following description of exemplary embodiments with reference to the attached drawings.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

Figure 1:
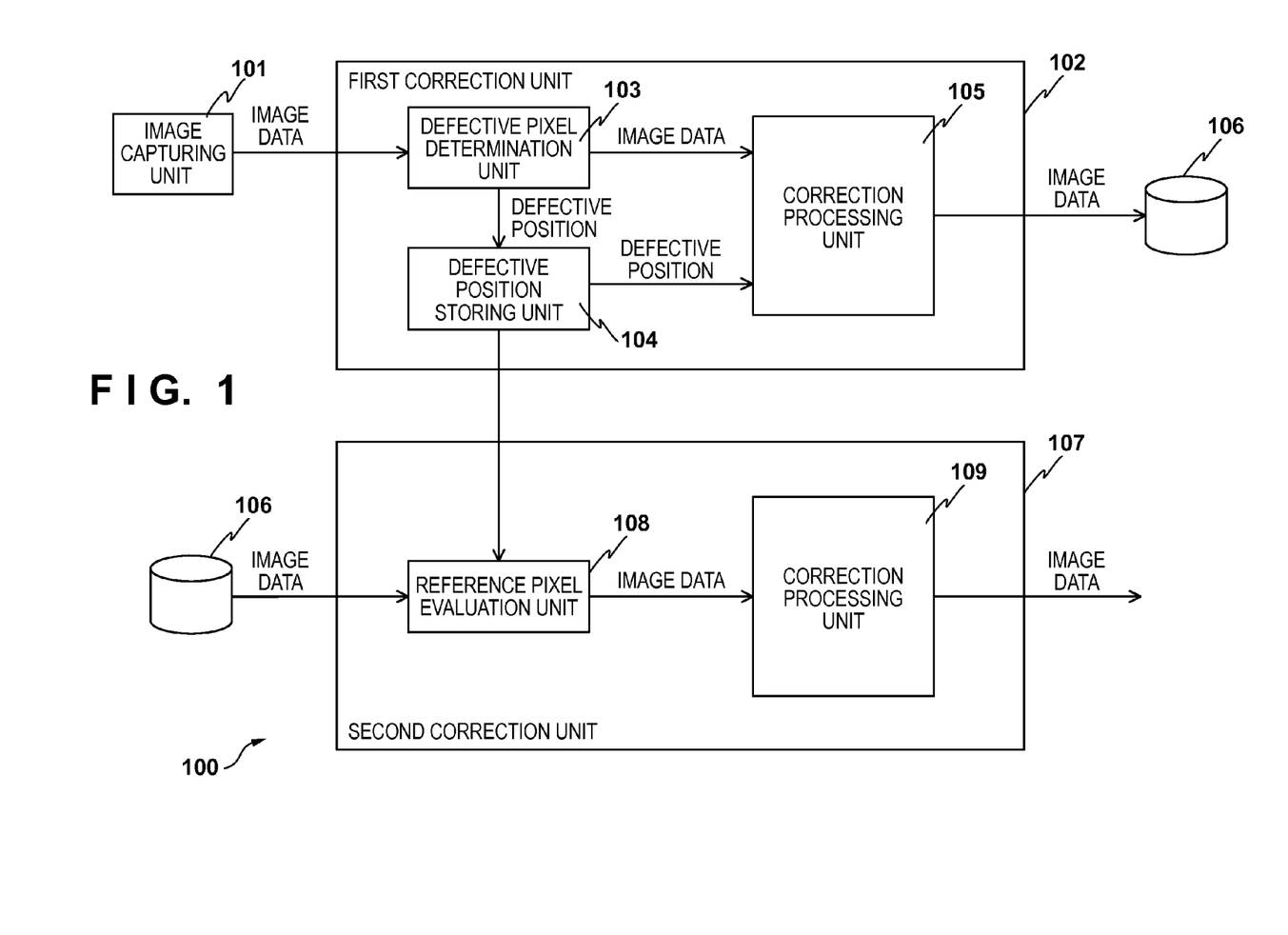
FIG. 1 is a block diagram showing a configuration of an image processing apparatus 100 according to first and second embodiments.

FIG. 1 is a block diagram showing a configuration of an image processing apparatus 100 according to a first embodiment. In FIG. 1, 101 denotes an image capturing unit having an image sensor. The image capturing unit 101 generates image data that is to be corrected by the image processing apparatus 100. Note that the image capturing unit 101 may be provided outside the image processing apparatus 100, or may be included in the image processing apparatus 100. In the latter case, the image processing apparatus 100 functions as an image capturing apparatus.

102 denotes a first correction unit that corrects the image data input from the image capturing unit 101. The first correction unit 102 includes a defective pixel determination unit 103, a defective position storing unit 104, and a correction processing unit 105. The defective pixel determination unit 103 determines whether or not each pixel of an input image is a defective pixel. The defective position storing unit 104 stores position information of a pixel that has been determined to be a defective pixel by the defective pixel determination unit 103. The correction processing unit 105 corrects pixel data of the pixel that has been determined to be a defective pixel by the defective pixel determination unit 103, using pixel data of peripheral pixels. At this time, the correction processing unit 105 acquires position information of a pixel that has already been determined to be a defective pixel from the defective position storing unit 104, and excludes the defective pixel among the peripheral pixels from the pixels to be used for the correction.

106 denotes a recording apparatus that stores image data corrected by the correction processing unit 105. 107 denotes a second correction unit that further corrects the image data stored in the recording apparatus 106. The second correction unit 107 includes a reference pixel evaluation unit 108 and a correction processing unit 109. The reference pixel evaluation unit 108 determines, for each pixel of the image data stored in the recording apparatus 106, whether or not a defective pixel is included in the peripheral pixels used for the correction performed by the correction processing unit 105. At this time, the reference pixel evaluation unit 108 acquires position information of the defective pixel from the defective position storing unit 104, and performs the determination based on the acquired position information. As mentioned above, the correction processing unit 105 excludes a pixel that has already been determined to be a defective pixel when correcting the pixel data to be corrected, from the peripheral pixels that are to be used for the correction. However, at this time, there is a possibility that a defective pixel that has yet not been subjected to the determination by the defective pixel determination unit 103 is included in the peripheral pixels, and thus in some cases the correction processing unit 105 performs the correction using such a defective pixel. A pixel position of this defective pixel is recorded in the defective position storing unit 104 at a subsequent time, and the reference pixel evaluation unit 108 can thereby detect that the defective pixel has been used at the time of the correction performed by the correction processing unit 105. The correction processing unit 109 corrects the pixel data of a pixel for which the reference pixel evaluation unit 108 has determined that a defective pixel has been used at the time of the correction, using the image data stored in the recording apparatus 106. That is to say, the correction processing unit 109 uses the same peripheral pixels as the peripheral pixels used by the correction processing unit 105, but uses, for the defective pixel in the peripheral pixels, the post-correction pixel data. The correction processing unit 109 outputs the post-correction image data. The output destination may be the recording apparatus 106, an external apparatus (e.g., a display), or the like.

Figure 2:
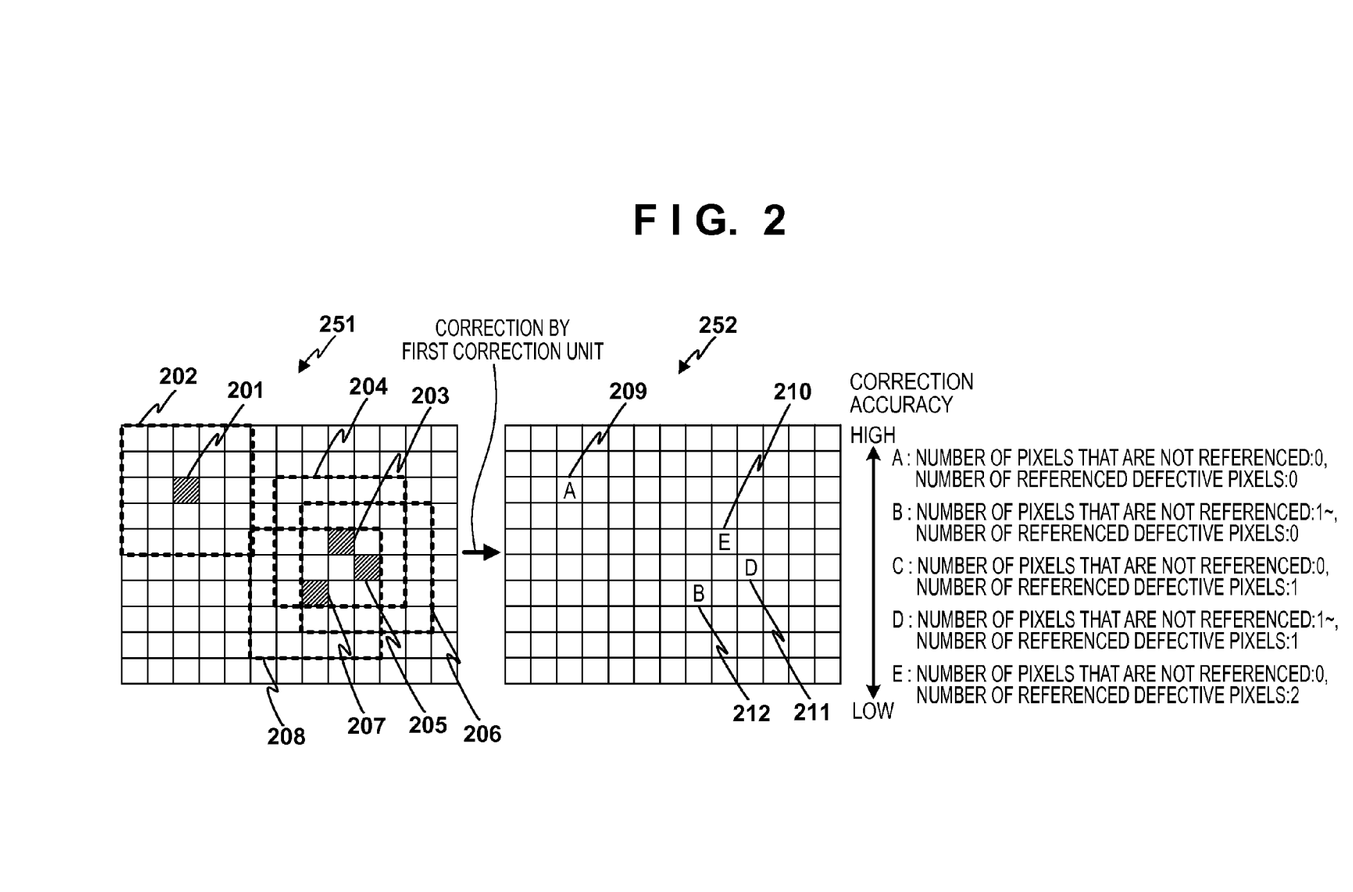
FIG. 2 is a conceptual diagram showing pre-correction and post-correction image data before and after correction performed by a first correction unit 102 according to the first and second embodiments.

FIG. 2 is a conceptual diagram showing pre-correction and post-correction image data before and after the correction performed by the first correction unit 102. Image data 251 is pre-correction image data, and image data 252 is post-correction image data. The image data 251 includes a plurality of pixels, and in particular includes defective pixels 201, 203, 205, and 207. In the example in FIG. 2, it is assumed that the first correction unit 102 sequentially processes pixels rightward from the left end in the uppermost row, sequentially processes pixels rightward from the left end of the second uppermost row after the right end pixel in the uppermost row, and subsequently continues processing in similar order. The defective pixel determination unit 103 performs the defective pixel determination in this order, and first detects the defective pixel 201. That is to say, the defective pixel 201 is a first defective pixel to be corrected. However, the pixel processing order is not limited thereto.

When correcting the defective pixel 201, the correction processing unit 105 performs the correction using pixels (peripheral pixels) within a dotted line frame 202. That is to say, the dotted line frame represents pixels that can be referenced for the correction. Since a defective pixel is not included in the dotted line frame 202, all pixels within the dotted line frame 202 are used for the correction, and no defective pixel is used. As a result, the defective pixel 201 is turned into a corrected pixel 209 with a relatively high correction accuracy.

Although a specific algorithm for the correction processing is not particularly limited, it should be noted that, as an example, the correction processing unit 105 can set an average value of pixel data of the peripheral pixels as a pixel value of a defective pixel. This also applies to correction processing performed by the correction processing unit 109, which will be described later with reference to FIG. 3.

Next, the defective pixel 203 is corrected using pixels within a dotted line frame 204. Although the defective pixels 205 and 207 are present within the dotted line frame 204, since the determination regarding the defective pixels 205 and 207 by the defective pixel determination unit 103 has not yet been performed at this time, the defective pixels 205 and 207 are unknown defective pixels. For this reason, all pixels within the dotted line frame 204 including the two defective pixels are used for the correction. As a result, the defective pixel 203 is turned into a corrected pixel 210 with a relatively low correction accuracy.

Next, the defective pixel 205 is corrected using pixels within a dotted line frame 206. At this time, the defective pixel 203 has already been determined to be a defective pixel by the defective pixel determination unit 103. On the other hand, the defective pixel 207 is an unknown defective pixel. For this reason, the defective pixel 203 is not used in the correction, but the defective pixel 207 is used in the correction. As a result, the defective pixel 205 is turned into a corrected pixel 211 with a correction accuracy that is higher than that of the corrected pixel 210 but is lower than that of the corrected pixel 209.

Lastly, the defective pixel 207 is corrected using pixels within a dotted line frame 208. At this time, both the defective pixels 203 and 205 are known defective pixels. For this reason, the defective pixels 203 and 205 are not used in the correction, and the correction processing unit 105 performs the correction using the remaining pixels within the dotted line frame 208. As a result, the defective pixel 207 is turned into a corrected pixel 212. The correction accuracy of the corrected pixel 212 is lower than that of the corrected pixel 209, but is relatively high since no defective pixel is used at the time of the correction.

Figure 3:
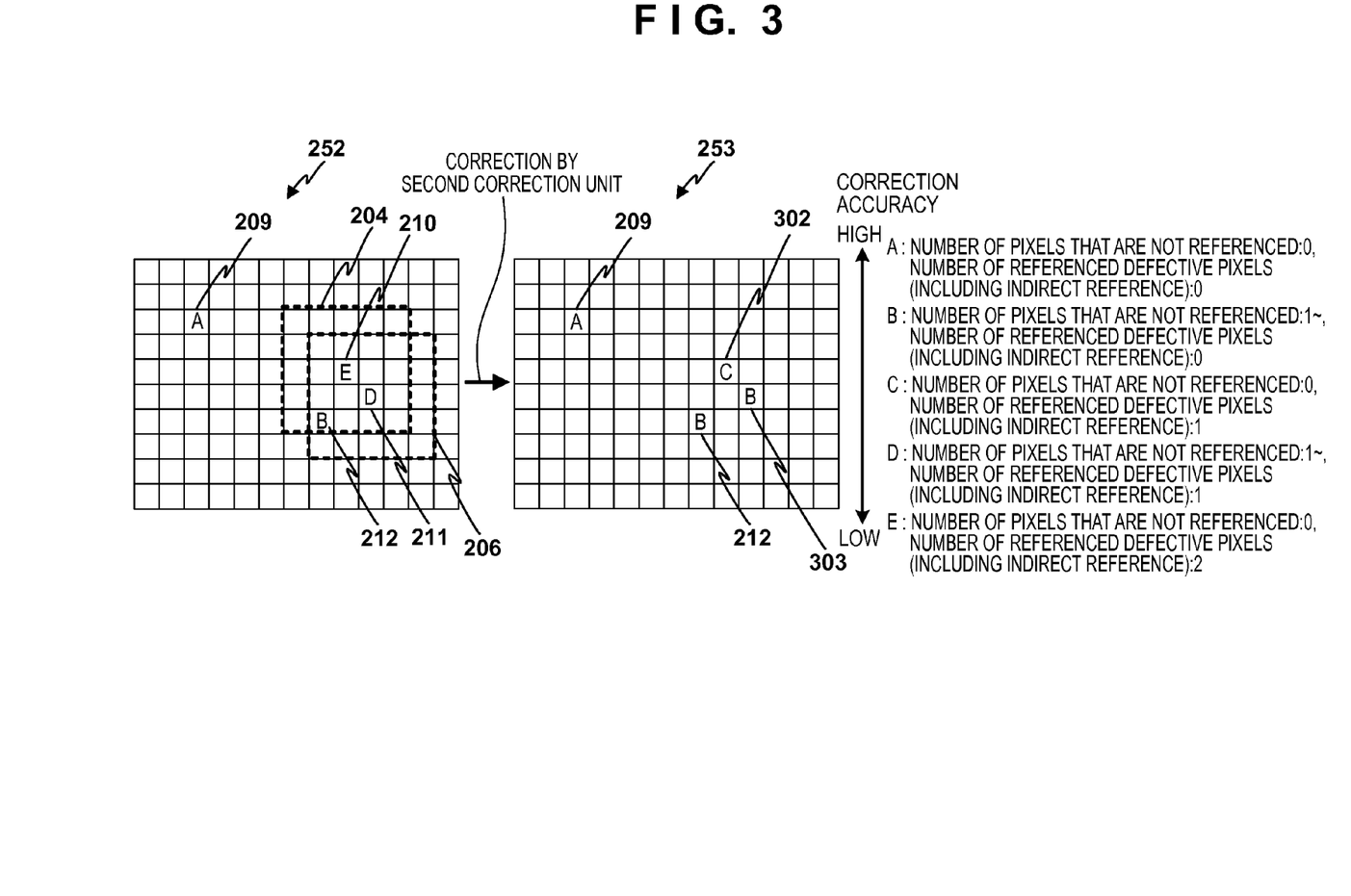
FIG. 3 is a conceptual diagram showing pre-correction and post-correction image data before and after the correction performed by a second correction unit 107 according to the first embodiment.

After the correction processing is performed by the first correction unit 102 as described above, correction processing is performed by the second correction unit 107. FIG. 3 is a conceptual diagram showing pre-correction and post-correction image data before and after the correction performed by the second correction unit 107. Image data 252 is pre-correction image data (the image data corrected by the first correction unit 102), and is the same as that shown in FIG. 2. Image data 253 is post-correction image data. The reference pixel evaluation unit 108 determines whether or not a defective pixel has been used at the time of the correction of each pixel of the image data 252 in the same order as that of the defective pixel determination unit 103. As a result, the corrected pixel 210 is detected as a first pixel to be corrected. However, the pixel processing order is not limited thereto.

The correction processing unit 109 corrects pixel data of the corrected pixel 210 using pixels within the dotted line frame 204, as in the correction of the defective pixel 203. However, unlike in the correction of the defective pixel 203, the correction processing unit 109 performs the correction using the corrected pixels 211 and 212 in place of the defective pixels 205 and 207. The corrected pixel 212 is a pixel corrected without using a defective pixel, whereas the corrected pixel 211 is a pixel corrected using one defective pixel. For this reason, using the corrected pixel 211 means indirectly using one defective pixel. As a result, the corrected pixel 210 is turned into a corrected pixel 302. The correction accuracy of the corrected pixel 302 is improved as compared with the correction accuracy of the corrected pixel 210, but does not reach the correction accuracy of the corrected pixel 212 since one defective pixel is indirectly used.

Next, the correction processing unit 109 corrects pixel data of the corrected pixel 211 using pixels within the dotted line frame 206, as in the correction of the defective pixel 205. However, unlike in the correction of the defective pixel 205, the correction processing unit 109 performs the correction using the corrected pixel 212 that has been corrected without using a defective pixel, in place of the defective pixel 207. The corrected pixel 210 is not used as in the correction of the defective pixel 205. As a result, the corrected pixel 211 is turned into a corrected pixel 303. The correction accuracy of the corrected pixel 303 is lower than that of the corrected pixel 209, but is relatively high since a defective pixel is not used at the time of the correction.

Figure 4:
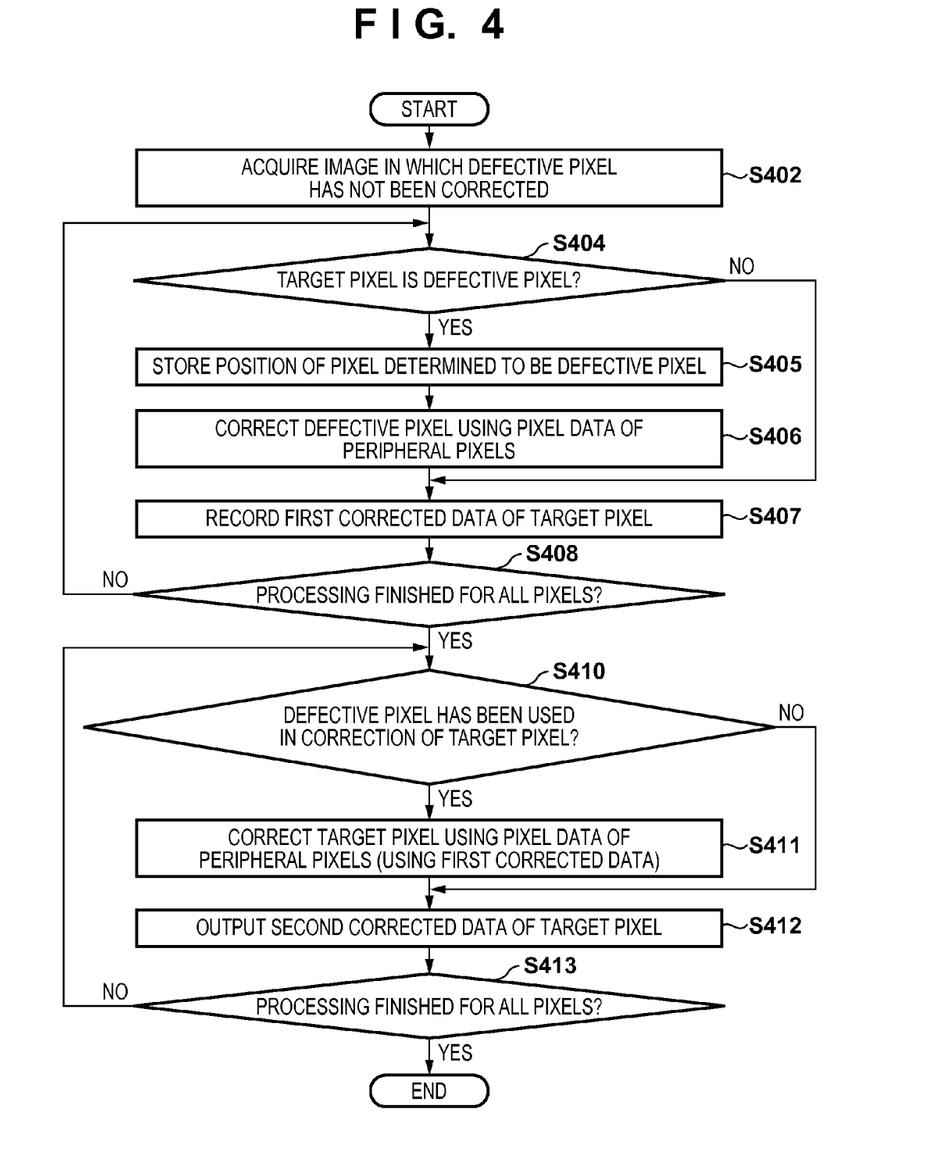
FIG. 4 is a flowchart of correction processing performed by the image processing apparatus 100 according to the first embodiment.

FIG. 4 is a flowchart of the correction processing performed by the image processing apparatus 100 according to the first embodiment. Initially, in step S402, the defective pixel determination unit 103 acquires image data from the image capturing unit 101. This image data includes a defective pixel that has not yet been corrected. In step S404, the defective pixel determination unit 103 determines whether or not a target pixel (processing target pixel) of the acquired image data is a defective pixel. The first target pixel is an upper left pixel, as described with reference to FIG. 2. If the target pixel is a defective pixel, the processing proceeds to step S405, and if not, the processing proceeds to step S407.

In step S405, the defective pixel determination unit 103 causes the defective position storing unit 104 to store the pixel position of the target pixel. In step S406, the correction processing unit 105 corrects the target pixel (defective pixel) using pixel data of peripheral pixels of the target pixel. At this time, the correction processing unit 105 performs the correction without using a known defective pixel by acquiring position information of the known defective pixel from the defective position storing unit 104. The details of the correction processing are as described with reference to FIG. 2.

In step S407, the correction processing unit 105 performs control (recording control) for recording corrected data of the target pixel in the recording apparatus 106. If the processing proceeds from step S404 to step S407, the correction processing unit 105 performs control (recording control) for recording an uncorrected target pixel as-is in the recording apparatus 106.

In step S408, the first correction unit 102 determines whether or not the processing has finished for all pixels. If a pixel remains that has not been subjected to the processing, the processing returns to step S404, and the first correction unit 102 repeats the same processing on the next target pixel. After the processing has finished for all pixels, the processing proceeds to step S410.

In step S410, the reference pixel evaluation unit 108 determines whether or not a defective pixel has been used in the correction of the target pixel by the correction processing unit 105. The first target pixel is an upper left pixel, as described with reference to FIG. 3. If a defective pixel has been used, the processing proceeds to step S411. If no defective pixel has been used, or if the target pixel has not been corrected, the processing proceeds to step S412.

In step S411, the correction processing unit 109 corrects the target pixel using the pixel data of the peripheral pixels of the target pixel. At this time, the correction processing unit 109 uses the pixel data recorded in step S407 as the pixel data of the peripheral pixels. The details of the correction processing are as described with reference to FIG. 3.

In step S412, the correction processing unit 109 outputs corrected data of the target pixel. If the processing proceeds from step S410 to step S412, the correction processing unit 109 outputs the target pixel as-is that has not been corrected by the correction processing unit 109.

In step S413, the second correction unit 107 determines whether or not processing has finished for all pixels. If a pixel remains that has not been subjected to the processing, the processing returns to step S410, and the second correction unit 107 repeats the same processing on the next target pixel. After the processing has finished for all pixels, the processing of this flowchart ends.

As described above, according to the first embodiment, the image processing apparatus 100 corrects each defective pixel of image data using peripheral pixels. If the first correction of the defective pixel is performed using another defective pixel, the image processing apparatus 100 performs a second correction on this defective pixel. At this time, the image processing apparatus 100 uses, for the other defective pixel that has been used in the first correction, pixel data that has been corrected by the first correction.

It is thereby possible, in the image processing apparatus that corrects a defective pixel using peripheral pixels, to suppress a decrease in the correction accuracy in the case where another defective pixel is included in the peripheral pixels.

Although a total of 24 peripheral pixels made up of pairs of pixels surrounding the target pixel vertically and horizontally are used in the correction in the description of the present embodiment, the number of peripheral pixels is not limited thereto, and a larger or smaller number of pixels may be used to perform the correction.

Second Embodiment

In the first embodiment, the correction processing unit 109 in the image processing apparatus 100 performs correction using pixel data that has been corrected by the correction processing unit 105. At this time, the correction processing unit 109 does not consider whether or not pixel data that has already been corrected by the correction processing unit 109 is present. Furthermore, the order in which the second correction unit 107 processes the pixels is the same as the order in which the first correction unit 102 processes the pixels.

In contrast, in a second embodiment, if pixel data that has been corrected by the correction processing unit 109 is present, the correction processing unit 109 performs second correction using this pixel data. Moreover, the second correction unit 107 processes the pixels in a reverse order of the processing order of the first correction unit 102.

Note that a basic configuration of the image processing apparatus 100 in the second embodiment is the same as that in the first embodiment (see FIG. 1). A difference from the first embodiment will be mainly described below.

Figure 5:
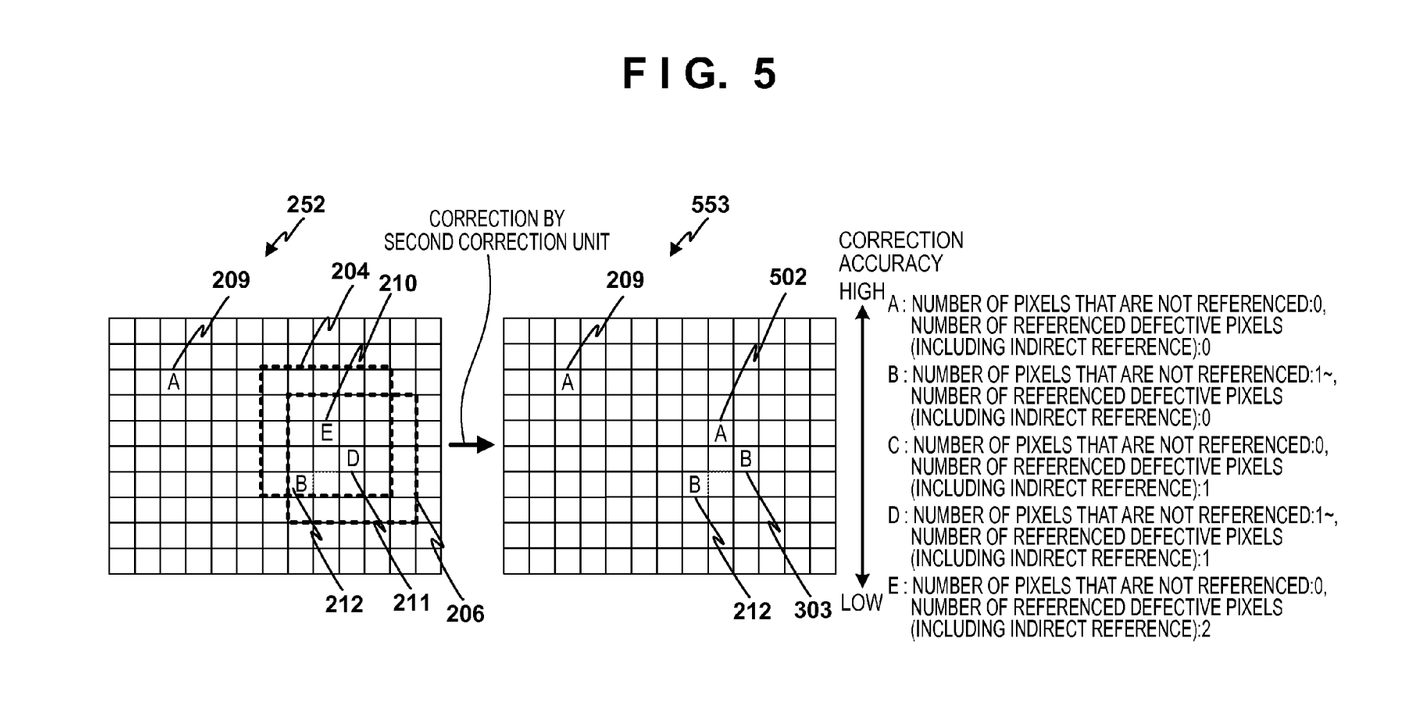
FIG. 5 is a conceptual diagram showing pre-correction and post-correction image data before and after the correction performed by the second correction unit 107 according to the second embodiment.

FIG. 5 is a conceptual diagram showing pre-correction and post-correction image data before and after the correction performed by the second correction unit 107. In FIG. 5, elements that are the same as or similar to those in FIG. 3 will be given the same reference numerals. Image data 553 is post-correction image data. The details of FIG. 5 will be described with reference to FIG. 6.

Figure 6:
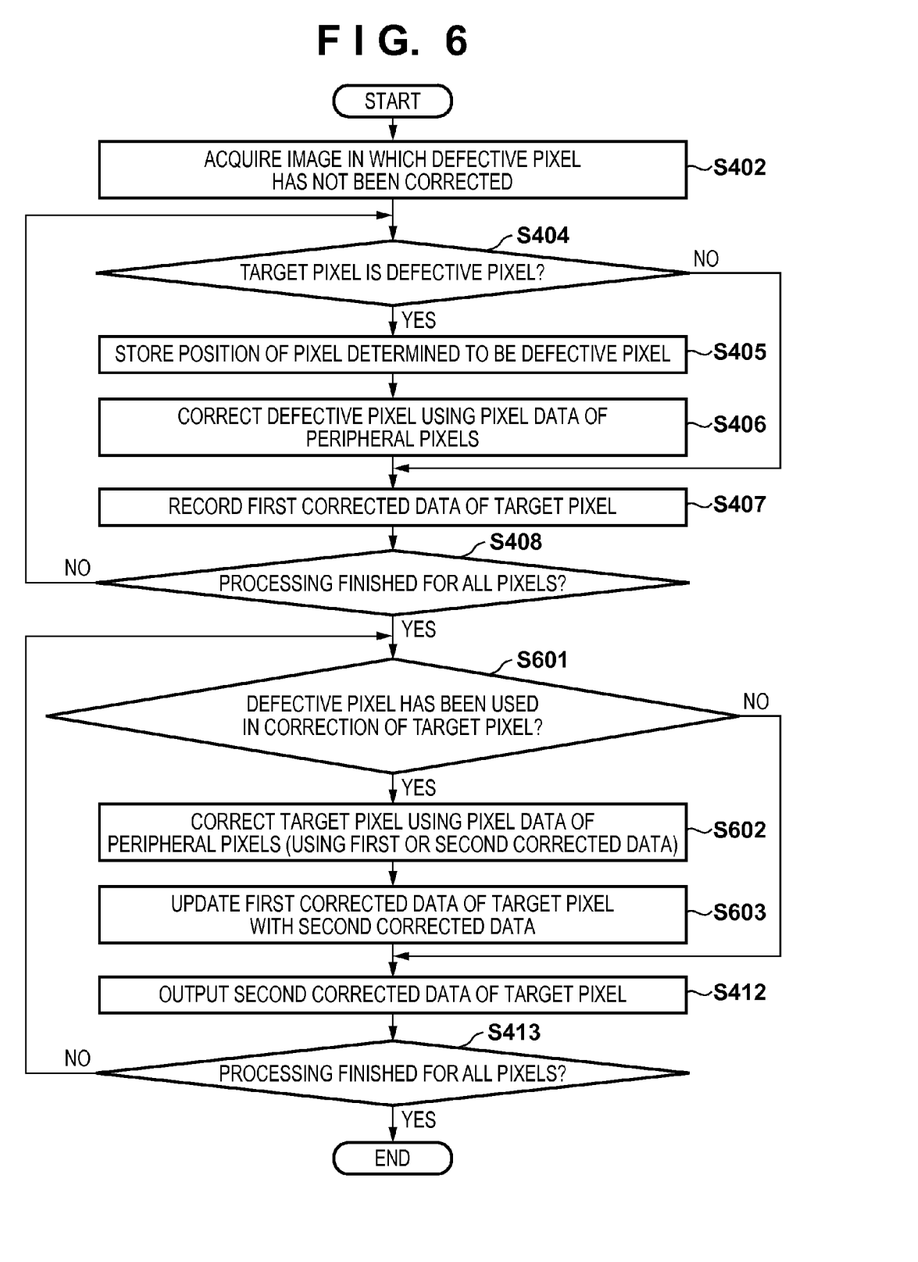
FIG. 6 is a flowchart of correction processing performed by the image processing apparatus 100 according to the second embodiment.

FIG. 6 is a flowchart of the correction processing performed by the image processing apparatus 100 according to the second embodiment. In FIG. 6, a step in which the same or similar processing as that in FIG. 4 is performed will be given the same reference numeral.

Step S601 is the same as step S410 in FIG. 4, but the order of target pixels is different from that in FIG. 4. Specifically, the second correction unit 107 sequentially processes pixels leftward from the right end in the lowermost row, sequentially processes pixels leftward from the right end in the second lowermost row after the left end pixel in the lowermost row, and subsequently continues the processing in similar order. Accordingly, the first target pixel is the lower right pixel. In step S601, the reference pixel evaluation unit 108 determines whether or not a defective pixel has been used in the correction of the target pixel by the correction processing unit 105. If a defective pixel has been used, the processing proceeds to step S602. If a defective pixel has not been used, or if the target pixel has not been corrected, the processing proceeds to step S412.

In step S602, the correction processing unit 109 corrects the target pixel using the pixel data of the peripheral pixels of the target pixel. At this time, the correction processing unit 109 uses the pixel data recorded in step S407, or pixel data updated in later-described step S603, as the pixel data of the peripheral pixels. In step S603, the correction processing unit 109 updates, with the data obtained by the correction processing in step S602, the corrected data of the target pixel recorded in step S407. Accordingly, when referencing the current target pixel in subsequent correction processing, the pixel data that has been corrected by the correction processing unit 109 (not by the correction processing unit 105) can be used. A specific example will now be described with reference to FIG. 5.

In FIG. 5, the correction processing for the corrected pixel 211 is basically the same as that in the first embodiment. However, in the second embodiment, the corrected pixel 211 recorded in the recording apparatus 106 is updated with the corrected pixel 303. For this reason, the corrected pixel 303 can be used in the correction processing for the corrected pixel 210 that is to be thereafter performed. That is to say, the corrected pixel 210 is corrected using the corrected pixel 211 in the first embodiment, whereas the corrected pixel 210 is corrected using the corrected pixel 303 in place of the corrected pixel 211 in the second embodiment. The corrected pixel 211 is obtained by the correction using a defective pixel, whereas the corrected pixel 303 is obtained by the correction that does not use a defective pixel. Therefore, the corrected pixel 210 is corrected without directly or indirectly using a defective pixel, and is turned into a corrected pixel 502 with a correction accuracy that is higher than that of the corrected pixel 302 (FIG. 3).

As described above, according to the second embodiment, when the image processing apparatus 100 performs the second correction on a defective pixel regarding which another defective pixel has been used in the first correction, if data of the other defective pixel after being subjected to the second correction is present, the image processing apparatus 100 uses the data after being subjected to the second correction. Also, the image processing apparatus 100 sets pixel processing order at the time of performing the second correction to be opposite to the pixel processing order at the time of performing the first correction. The correction accuracy is thereby further improved.

Third Embodiment

In the first and second embodiments, the image processing apparatus 100 does not particularly consider the pixel type (pixel color). In contrast, in a third embodiment, an image processing apparatus 700 performs second correction only on a pixel of a predetermined pixel type.

Figure 7:
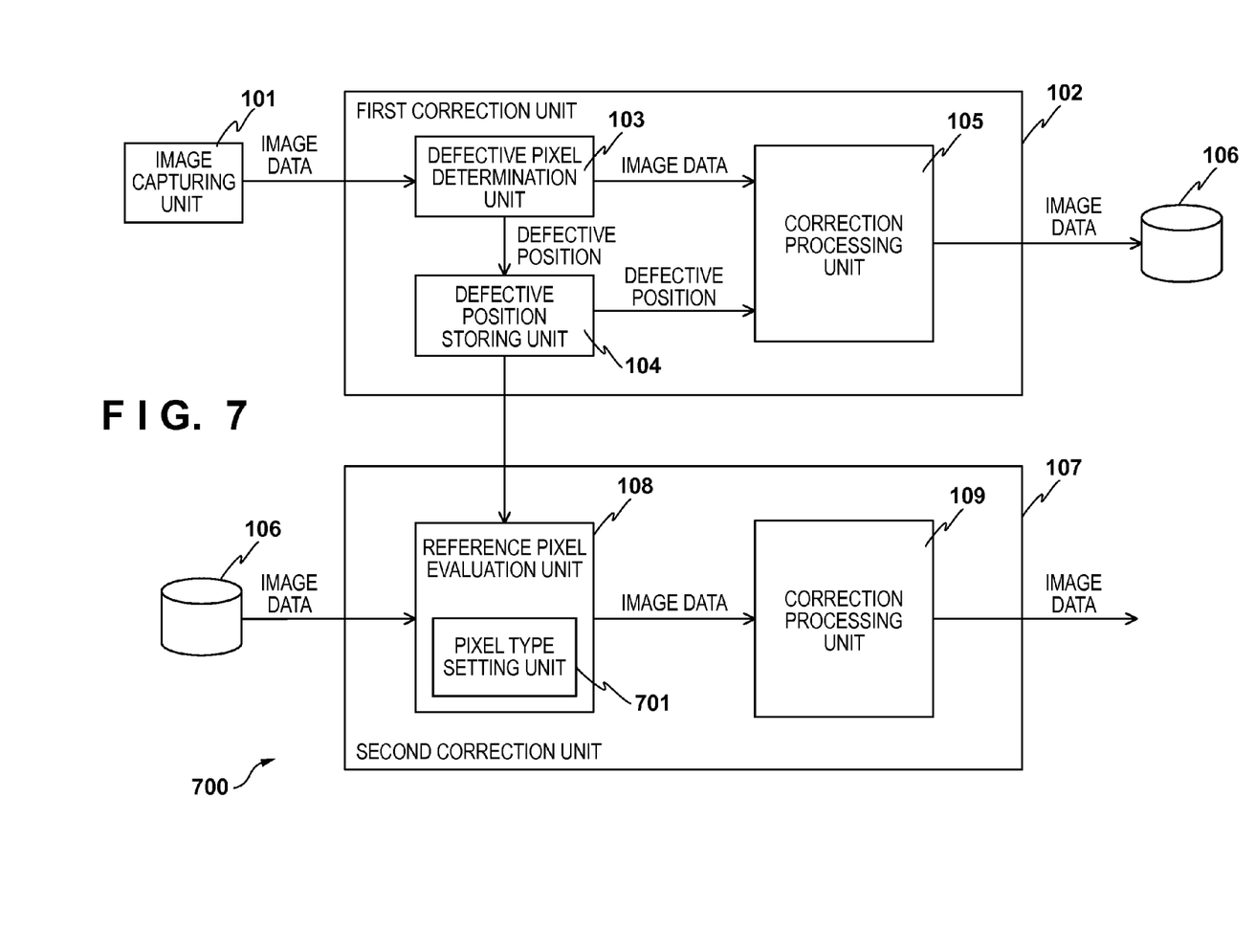
FIG. 7 is a block diagram showing a configuration of an image processing apparatus 700 according to a third embodiment.

FIG. 7 is a block diagram showing a configuration of the image processing apparatus 700 according to a third embodiment. In FIG. 7, configurations that are the same as or similar to those in FIG. 1 will be given the same reference numerals. A difference from the first and second embodiments will be mainly described below.

The reference pixel evaluation unit 108 of the image processing apparatus 700 includes a pixel type setting unit 701. The pixel type setting unit 701 sets a pixel type that is to be a target of processing performed by the second correction unit 107 (i.e., a target of the second correction).

Figure 8A:
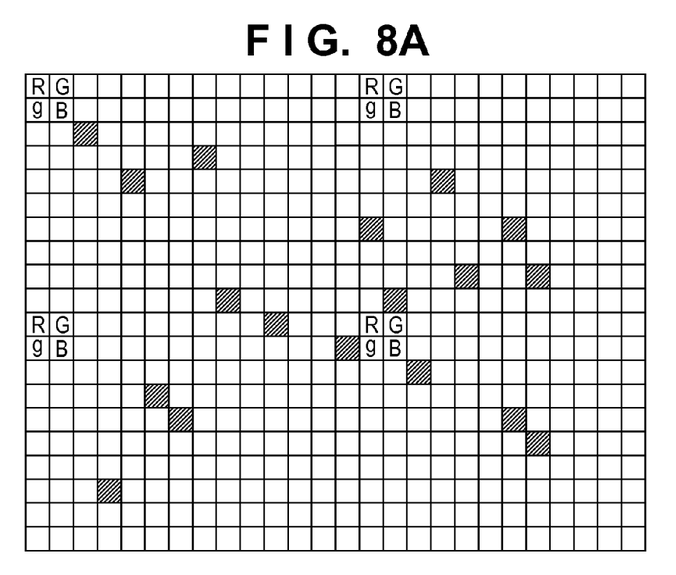
FIGS. 8A to 8E are conceptual diagrams showing pre-correction image data before the correction performed by a first correction unit 102 according to the third embodiment.
Figure 8B:
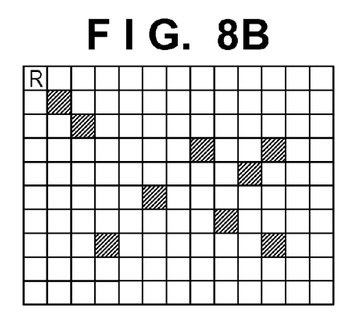
Figure 8C:
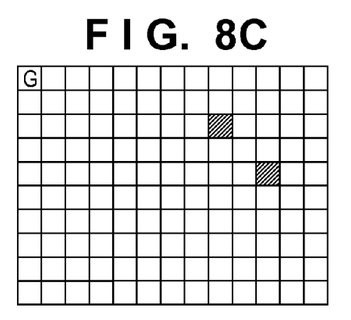
Figure 8D:
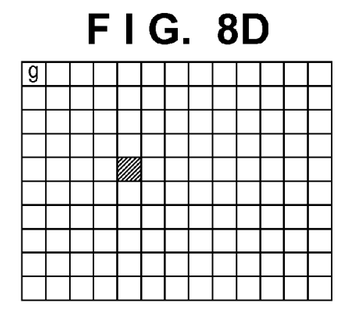
Figure 8E:
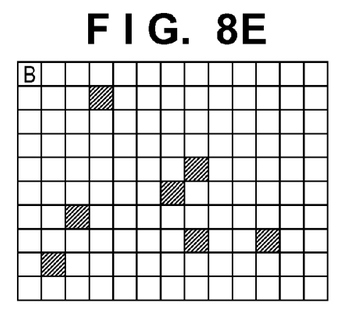
Figure 9A:
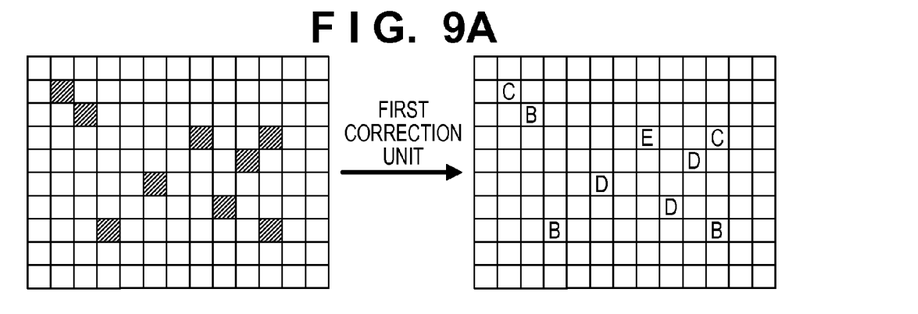
FIGS. 9A to 9D are conceptual diagrams showing pre-correction and post-correction image data before and after the correction performed by the first correction unit 102 according to the third embodiment.
Figure 9B:
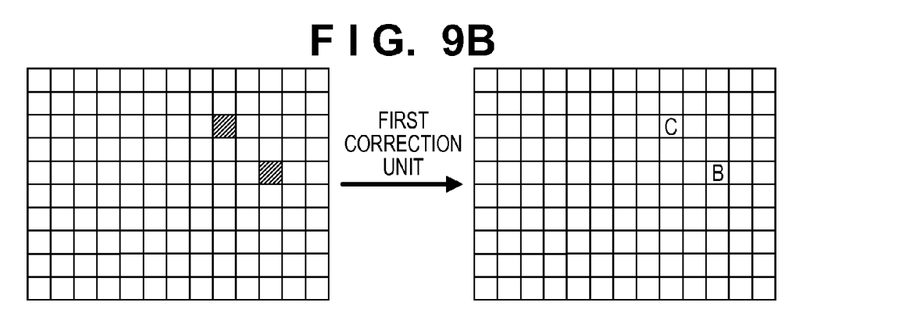
Figure 9C:
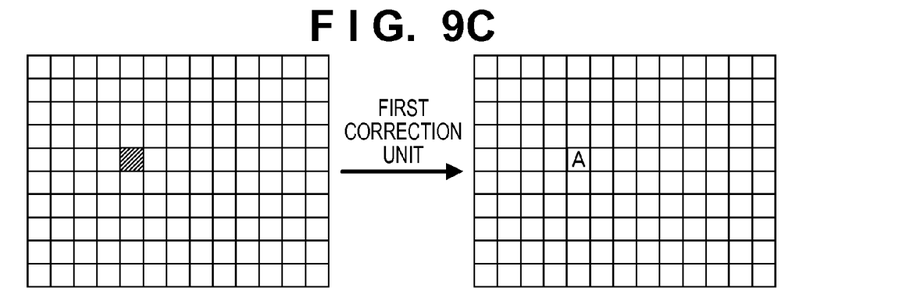
Figure 9D:
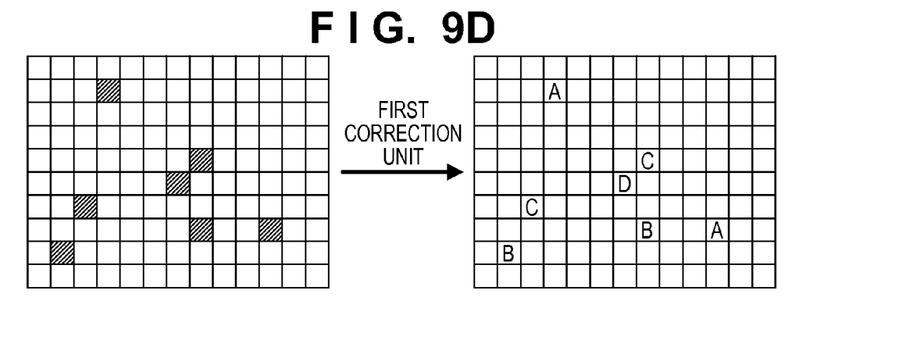

FIGS. 8A to 8E are conceptual diagrams showing pre-correction image data before the correction performed by the first correction unit 102 according to the third embodiment. In FIGS. 8A to 8E, shaded portions indicate defective pixels. FIG. 8A shows overall Bayer array (R, G, g, B) image data. FIG. 8B shows pixel data of R pixels in the overall image data, FIG. 8C shows pixel data of G pixels in the overall image data, FIG. 8D shows pixel data of g pixels in the overall image data, and FIG. 8E shows pixel data of B pixels in the overall image data.

FIGS. 9A to 9D are conceptual diagrams showing pre-correction and post-correction image data before and after the correction performed by the first correction unit 102 according to the third embodiment. Left sections of FIGS. 9A, 9B, 9C, and 9D correspond to FIGS. 8B, 8C, 8D, and 8E, respectively. Right sections in FIGS. 9A, 9B, 9C and 9D indicate image data corrected by the first correction unit 102. "A" to "E" indicate correction accuracies, as in FIG. 2 and other similar drawings. Although a total of 24 peripheral pixels made up of pairs of pixels surrounding the target pixel vertically and horizontally were used in the correction in the present embodiment as in the first and second embodiment, the number of peripheral pixels is not limited thereto.

Figure 10A:
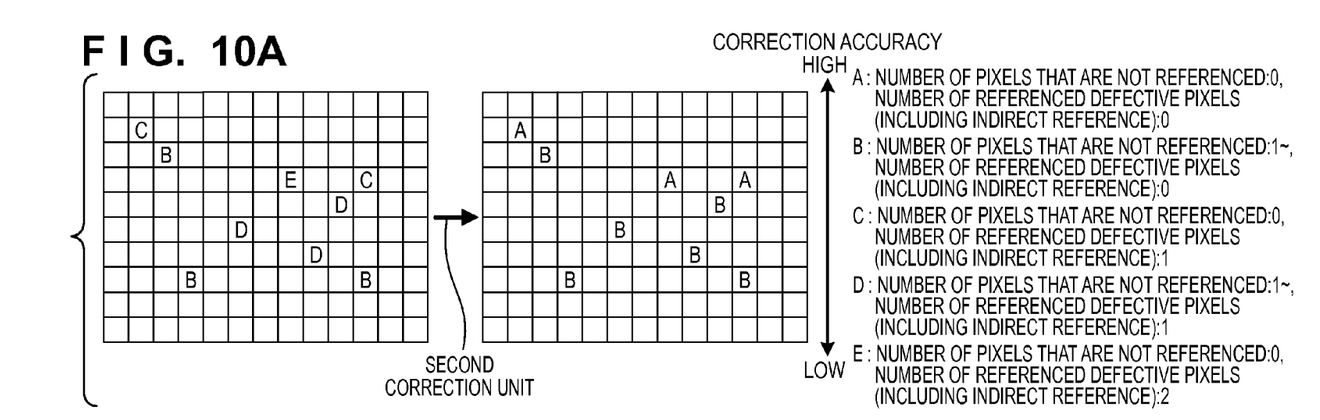
FIGS. 10A and 10B are conceptual diagrams showing pre-correction and post-correction image data before and after the correction performed by the second correction unit 107 according to the third embodiment.
Figure 10B:
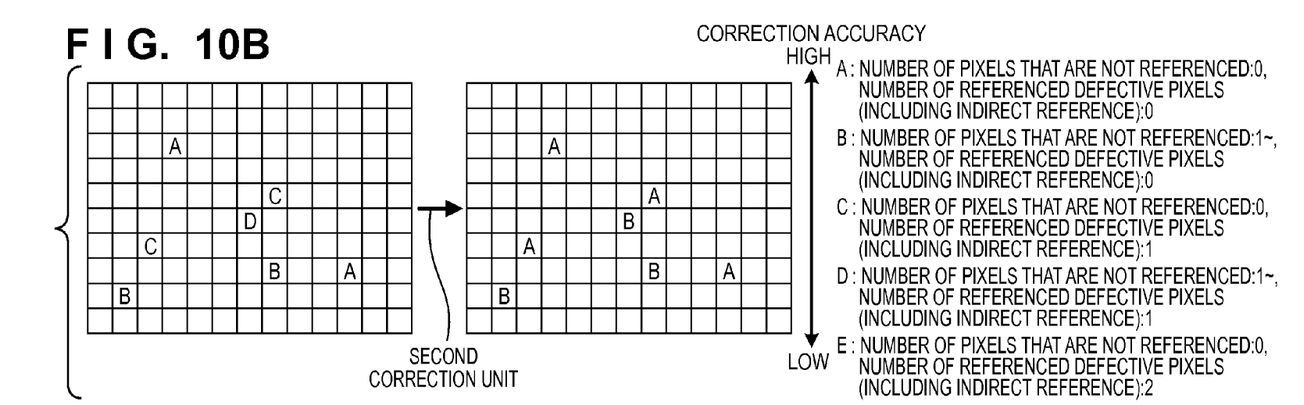

FIGS. 10A and 10B are conceptual diagrams showing pre-correction and post-correction image data before and after the correction performed by the second correction unit 107 according to the third embodiment. Left sections in FIGS. 10A and 10B correspond to the right sections in FIGS. 9A and 9D, respectively. That is to say, in the example in FIGS. 10A and 10B, pixel types "R (red)" and "B (blue)" are processing target pixel types. However, the processing target pixel types are not limited to "R (red)" and "B (blue)". For example, the processing target pixel type may be one of "R (red)" and "B (blue)". Right sections in FIGS. 10A and 10B indicate image data corrected by the second correction unit 107.

Figure 11:
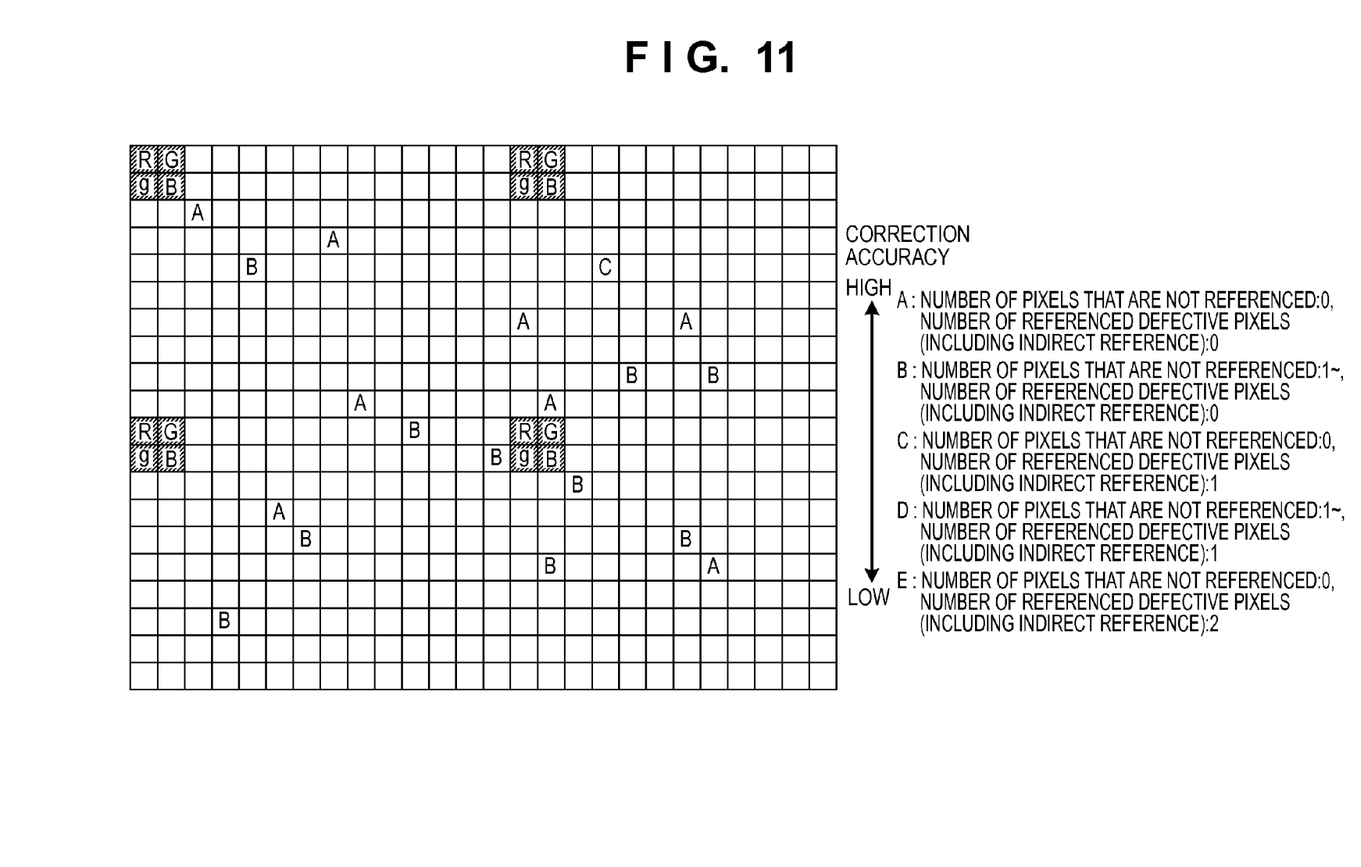
FIG. 11 is a conceptual diagram showing overall image data corrected by the second correction unit 107 according to the third embodiment.

FIG. 11 is a conceptual diagram showing overall image data corrected by the second correction unit 107 according to the third embodiment. The image data in FIG. 11 is obtained by rearranging the right sections in FIGS. 10A, 9B, 9C, and 10B in conformity to the Bayer array. In FIG. 11, "R", "G", "g", and "B" indicating pixel colors are shaded in order to distinguish between "B" indicating the correction accuracy and "B" indicating a blue pixel. Note that the array of the pixels is not limited to the Bayer array.

Figure 12:
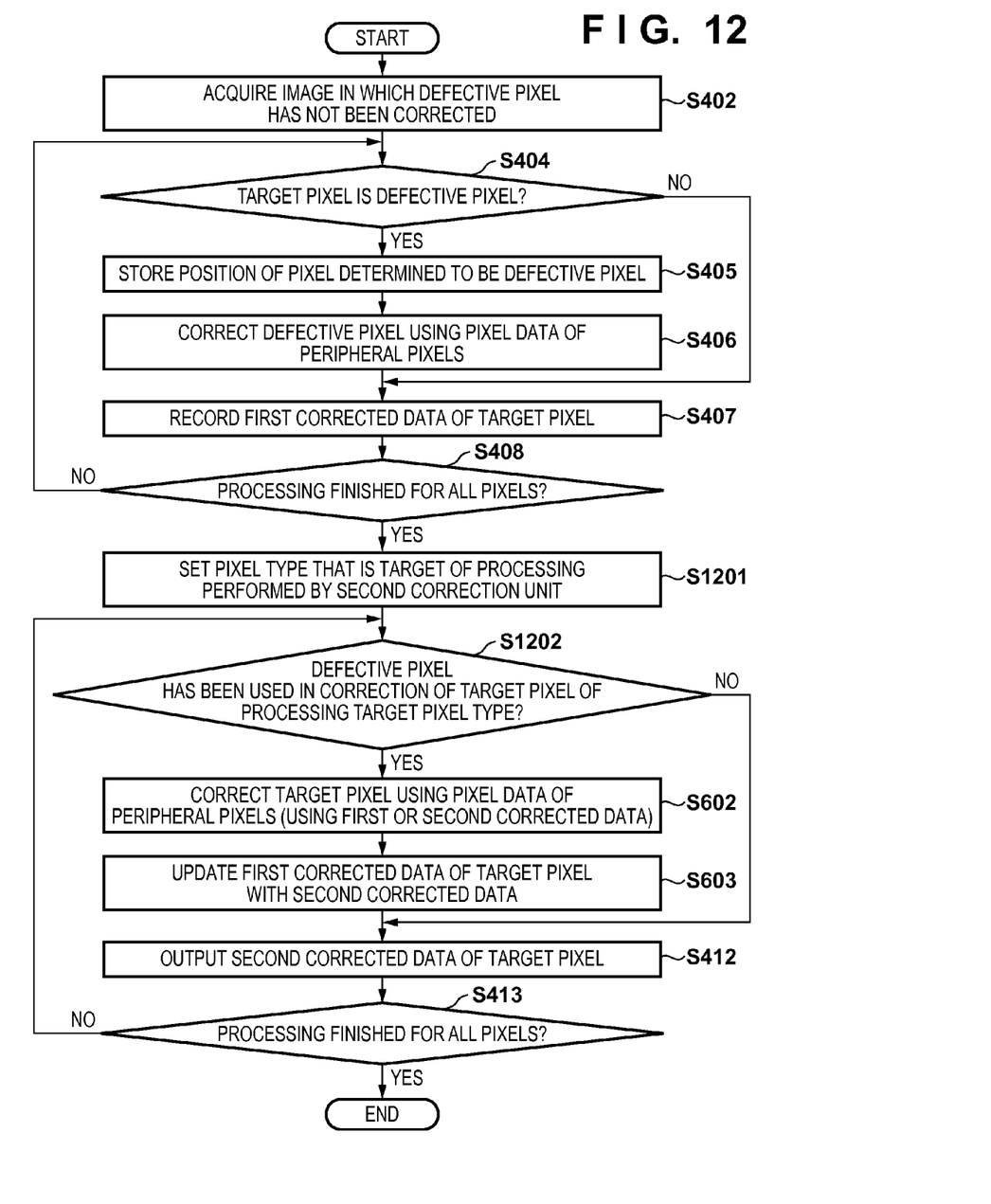
FIG. 12 is a flowchart of correction processing performed by the image processing apparatus 700 according to the third embodiment.

FIG. 12 is a flowchart of the correction processing performed by the image processing apparatus 700 according to the third embodiment. In FIG. 12, steps in which the same or similar processing as that in FIG. 6 are performed will be given the same reference numerals.

In step S1201, the pixel type setting unit 701 sets a pixel type of a target of the processing performed by the second correction unit 107. In the present embodiment, it is assumed that the pixel type setting unit 701 sets "R (red)" and "B (blue)" as the processing target pixel types. Note that the pixel type setting unit 701 may set a processing target pixel type in accordance with a defective pixel position. Alternatively, the pixel type setting unit 701 may set a processing target pixel type in advance before start of the processing of this flowchart.

Step S1202 is the same as step S601 in FIG. 6, but is different from step S601 in that the determination is performed only regarding a pixel of the processing target pixel type. Regarding a pixel of a pixel type that is not the processing target, the processing proceeds to step S412 regardless of whether or not a defective pixel has been used in the correction. If a defective pixel has been used in the correction of the pixel of the processing target pixel type in step S406, the processing proceeds to step S602. Subsequent processing is the same as that in the second embodiment. Note that the pixel processing order in step S1202 may be the same as the processing order in the first embodiment, not as the processing order in the second embodiment.

With the above processing, the correction shown in FIGS. 9A to 9D, 10A, and 10B is performed on the image data in FIG. 8A, and ultimately, the image data shown in FIG. 11 is obtained.

As described above, according to the third embodiment, the image processing apparatus 700 performs the processing of the second correction unit 107 only on a pixel of a specific pixel type.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-139999, filed Jul. 7, 2014 which is hereby incorporated by reference herein in its entirety.

What is claimed is:

1. An image processing apparatus comprising:
a first correction unit configured to set each of a plurality of pixels included in an image as a target pixel in sequence, determine whether or not the target pixel is a defective pixel, and correct the target pixel using peripheral pixels of the target pixel in a case where the target pixel is determined to be a defective pixel, wherein the first correction unit does not use, in the correction of the target pixel, a defective pixel in the peripheral pixels that is known at the time of the correction of the target pixel; and
a second correction unit configured to correct each corrected pixel that has been corrected by the first correction unit using a defective pixel which was unknown at the time of the correction, using the peripheral pixels used by the first correction unit, wherein the second correction unit uses, for the defective pixel in the peripheral pixels used by the first correction unit, a corrected pixel obtained by correcting the defective pixel by the first correction unit.

2. The image processing apparatus according to claim 1, wherein, for a pixel that has already been corrected by the second correction unit among defective pixels in the peripheral pixels used by the first correction unit, the second correction unit uses the post-correction pixel corrected by the second correction unit.

3. The image processing apparatus according to claim 2, wherein an order in which the second correction unit corrects each pixel is opposite from an order in which the first correction unit corrects each pixel.

4. The image processing apparatus according to claim 1, further comprising:
a recording control unit configured to record, in a recording unit, the plurality of pixels included in the image, the recording control unit recording, for a defective pixel in the plurality of pixels, a corrected pixel obtained by correcting the defective pixel by the first correction unit.

5. The image processing apparatus according to claim 4, wherein the second correction unit references a pixel recorded in the recording unit to perform the correction.

6. The image processing apparatus according to claim 5, wherein the second correction unit updates a pixel recorded in the recording unit with a pixel that has been corrected by the second correction unit.

7. The image processing apparatus according to claim 1, wherein the second correction unit corrects a pixel of a predetermined color among corrected pixels corrected by the first correction unit using a defective pixel that was unknown at the time of the correction.

8. The image processing apparatus according to claim 7, wherein the predetermined color includes at least one of red and blue.

9. An image capturing apparatus comprising:
an image processing apparatus comprising:
a first correction unit configured to set each of a plurality of pixels included in an image as a target pixel in sequence, determine whether or not the target pixel is a defective pixel, and correct the target pixel using peripheral pixels of the target pixel in a case where the target pixel is determined to be a defective pixel, wherein the first correction unit does not use, in the correction of the target pixel, a defective pixel in the peripheral pixels that is known at the time of the correction of the target pixel; and
a second correction unit configured to correct each corrected pixel that has been corrected by the first correction unit using a defective pixel which was unknown at the time of the correction, using the peripheral pixels used by the first correction unit, wherein the second correction unit uses, for the defective pixel in the peripheral pixels used by the first correction unit, a corrected pixel obtained by correcting the defective pixel by the first correction unit; and
an image capturing unit that generates the image.

10. An image processing method performed by an image processing apparatus, the method comprising:
a first correction step of setting each of a plurality of pixels included in an image as a target pixel in sequence, determining whether or not the target pixel is a defective pixel, and correcting the target pixel using peripheral pixels of the target pixel in a case where the target pixel is determined to be a defective pixel, wherein the first correction step does not use, in the correction of the target pixel, a defective pixel in the peripheral pixels that is known at the time of the correction of the target pixel; and
a second correction step of correcting each corrected pixel that has been corrected in the first correction step using a defective pixel which was unknown at the time of the correction, using the peripheral pixels used in the first correction step, wherein the second correction step uses, for the defective pixel in the peripheral pixels used in the first correction step, a corrected pixel obtained by correcting the defective pixel in the first correction step.

11. A non-transitory computer-readable storage medium storing a program for causing a computer to execute an image processing method, the method comprising:
a first correction step of setting each of a plurality of pixels included in an image as a target pixel in sequence, determining whether or not the target pixel is a defective pixel, and correcting the target pixel using peripheral pixels of the target pixel in a case where the target pixel is determined to be a defective pixel, wherein the first correction step does not use, in the correction of the target pixel, a defective pixel in the peripheral pixels that is known at the time of the correction of the target pixel; and
a second correction step of correcting each corrected pixel that has been corrected in the first correction step using a defective pixel which was unknown at the time of the correction, using the peripheral pixels used in the first correction step, wherein the second correction step uses, for the defective pixel in the peripheral pixels used in the first correction step, a corrected pixel obtained by correcting the defective pixel in the first correction step.

* * * * *